Jan. 10, 1939.                R. H. NEWTON                2,143,025
                        MAKING MONOCALCIUM PHOSPHATE
                            Filed March 2, 1936
ACCELERATING THE REACTION BETWEEN PHOSPHATE
ROCK AND CONCENTRATED PHOSPHORIC ACID
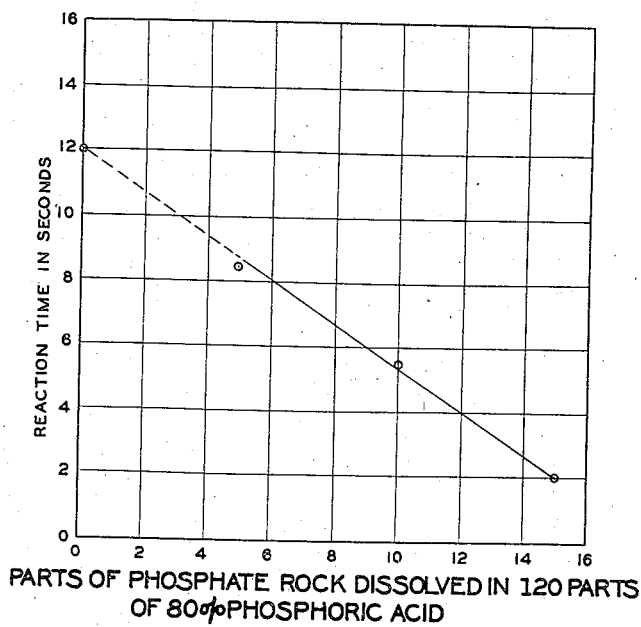
PARTS OF PHOSPHATE ROCK DISSOLVED IN 120 PARTS
OF 80% PHOSPHORIC ACID
Roger H. Newton
INVENTOR
BY Arthur L. Davis
ATTORNEY Patented Jan. 10, 1939

2,143,025

UNITED STATES PATENT OFFICE 2,143,025

MAKING MONOCALCIUM PHOSPHATE

Roger H. Newton, near Sheffield, Ala.

Application March 2, 1936, Serial No. 66,587

7 Claims. (Cl. 23—109)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process for making superphosphates and particularly for making mono-calcium phosphate.

One of the objects of this invention is to provide a means for accelerating the reaction between calcium containing materials and concentrated phosphoric acid in making mono-calcium phosphate. Another object of this invention is to produce fluid, partially reacted mixtures which, on spraying, set into discrete, globular masses in a much shorter time than would be required after the dispersion of ordinary mixtures of the reactants. Other objects of this invention include the provision of a means for producing a dispersible, fluid mixture which will require the use of a much shorter spray tower for the completion of the treatment to produce the finished product.

A process for making mono-calcium phosphate, involving the use of spray towers, is disclosed in a copending application, app. Ser. No. 728,917, filed June 4, 1934. A further study of this process has been made looking toward the reduction in the size of the equipment required with the consequent reduction in the cost of manufacture. Since the largest unit of equipment used in the above mentioned process is the spray tower, efforts were made to reduce the size of the tower required by accelerating the setting of the partially reacted mixtures, when distributed in the top of the tower, so that a finished product could be withdrawn from a tower of shorter length.

I have discovered an effective means for materially accelerating the reaction velocity of reaction mixtures used in making mono-calcium phosphate in which concentrated phosphoric acid is the principal liquid constituent by forming a solution or dispersion of a calcium phosphate in the concentrated phosphoric acid and then mixing a sufficient quantity of the calcium containing material to react with the free phosphoric acid in the mixture with the phosphoric acid solution or dispersion of the phosphate so formed.

One example for the operation of my process is given for accelerating the setting of the reaction mixture during the production of mono-calcium phosphate from phosphate rock and concentrated phosphoric acid. The phosphate rock used contained 28% $P_2O_5$ and 39% CaO. A screen analysis of this rock showed 100% through 100 mesh, 80% through 200 mesh, and 60% through 325 mesh. The concentrated phosphoric acid used contained 80% by weight of $H_3PO_4$. A portion of the total amount of the rock required to react with all of the concentrated phosphoric acid was dispersed in the acid in a mixer capable of giving a thorough homogenization. Then the remainder of the rock was added to the solution of calcium phosphate in the concentrated phosphoric acid in a second mixer and the time required for the reaction material to set was observed. The temperature of the reactants in the second mixer was 100° F. in all cases. The acceleration of the setting is shown in the following table:

| Run No. | Parts by weight 80% $H_3PO_4$ | Parts by weight phosphate rock dissolved in acid | Parts by weight phosphate rock added | Reaction (setting) time/sec. |
|---|---|---|---|---|
| 1 | 120 | 0 | 100 | 12.0 |
| 2 | 120 | 5 | 95 | 8.5 |
| 3 | 120 | 10 | 90 | 5.5 |
| 4 | 120 | 15 | 85 | 2.0 |

The results obtained for the accelerating the reaction of the phosphate rock and concentrated phosphoric acid are shown graphically in the accompanying drawing, which forms a part of this specification. The parts by weight of phosphate rock dissolved in the 120 parts by weight of 80% phosphoric acid are shown as abscissae and the reaction times in seconds are shown as ordinater. It will be observed that when 6 parts by weight of phosphate rock, that is, 6.25% by weight of the phosphoric acid, is used the time required for setting is reduced one-third. Furthermore, it will be observed that when 15 parts by weight of the phosphate rock, that is, 15.6% by weight of the phosphoric acid, is used the time required for setting of the reaction mixture is only one-sixth of that required for the setting of a mixture obtained by the simultaneous mixing of all of the same reactants.

It is evident that there are numerous factors which will influence conditions for the most satisfactory operation of my invention, the actual limits of which cannot be established except by a detailed study of each set of raw materials and the intermediate and finished products involved.

The term "concentrated phosphoric acid" means and includes phosphoric acid containing at least 65% by weight of $H_3PO_4$. The preferred concentration of the concentrated phosphoric acid is from 75% to 90% by weight of $H_3PO_4$.

The other constituent of the concentrated phosphoric acid, of concentration less than 100% by weight of $H_3PO_4$, will ordinarily be water and such other minor impurities present in the commercial product. However, under certain circumstances, it has been found to be advantageous, and economical as well, to use a concentrated phosphoric acid, containing at least 65% by weight of $H_3PO_4$, and in which the other constituents of the acid solution include varying proportions of sulfuric acid, for example, a concentrated phosphoric acid, containing 70% by weight of $H_3PO_4$ and 15% by weight of $H_2SO_4$, may be used. The amount of the concentrated phosphoric acid used is preferably that required theoretically to form monocalcium phosphate from the calcium containing material used. However, actually this amount may vary from 75% to 125% of that theoretically required for the formation of mono-calcium phosphate.

Any calcium containing compound, reactive with concentrated phosphoric acid to form monocalcium phosphate, such as lime, limestone, phosphate rock, or calcium phosphate may be used for the preliminary reaction with the concentrated phosphoric acid to form a solution or dispersion of calcium phosphate in the phosphoric acid or may be used to react with the free phosphoric acid contained in the resulting mixture. The same calcium containing compound may be used in both steps of the process or different calcium containing compounds may be used in each step of the process. The particle size of the calcium containing compound used, either to form the solution of calcium phosphate in phosphoric acid or to react with the solution, may vary from 50 mesh to 10 microns, although it is generally considered that a size smaller than 200 mesh is preferred.

The decrease in the reaction time for mixtures of calcium containing compounds, reactive with phosphoric acid to form mono-calcium phosphate, and the concentrated phosphoric acid, containing a calcium phosphate dispersed or in solution, is directly proportional to the amount of calcium phosphate dispersed or in solution. The amount of this calcium phosphate, thus dispersed or in solution will, of course, vary depending on the temperature of the mixture. While the solubility under equilibrium conditions has not been accurately determined, it has been found possible to disperse or dissolve, in concentrated phosphoric acid solutions, containing 80% to 85% by weight of $H_3PO_4$, an amount of calcium phosphate, calculated as mono-calcium phosphate, equivalent to between 25 and 30 g. $CaH_4(PO_4)_2$ per 100 g. of mixture at 25° C. This dispersion or solution is stable, will not settle out on long standing and closely approximates the properties of a true solution.

It will be seen, therefore, that this invention may be carried out by the modification of certain details without departing from its spirit or scope.

I claim:

1. Process for reducing the time of setting of a reaction mixture of concentrated phosphoric acid and fine phosphate rock to approximately one-third to one-sixth of that required for the setting of a mixture obtained by the simultaneous mixing of all of the same reactants, which comprises, completely reacting a portion of the fine phosphate rock, which has a particle size such that at least substantially all of this portion will pass through a 200 mesh screen, and the concentrated phosphoric acid, containing at least 65% by weight of $H_3PO_4$, the amount of the fine phosphate rock being not more than that required to react with 20% of the $H_3PO_4$ in the concentrated phosphoric acid; and immediately mixing the remainder of the fine phosphate rock with the mixture resulting from the complete reaction of the portion of the fine phosphate rock and the concentrated phosphoric acid, the amount of the fine phosphate rock being substantially that required to react with the phosphoric acid in the mixture to form monocalcium phosphate.

2. Process for reducing the time of setting of a reaction mixture of concentrated phosphoric acid and fine phosphate rock to approximately one-third to one-sixth of that required for the setting of a mixture obtained by the simultaneous mixing of all of the same reactants, which comprises, completely reacting a portion of fine limestone, which has a particle size such that at least substantially all of this portion will pass through a 200 mesh screen, and the concentrated phosphoric acid, containing at least 65% by weight of $H_3PO_4$, the amount of the fine limestone being not more than that required to react with 20% of the $H_3PO_4$ in the concentrated phosphoric acid; and immediately mixing the fine phosphate rock with the mixture resulting from the complete reaction of the portion of the fine limestone and the concentrated phosphoric acid, the amount of the fine phosphate rock being substantially that required to react with the free phosphoric acid in the mixture to form monocalcium phosphate.

3. Process for reducing the time of setting of a reaction mixture of concentrated phosphoric acid and fine phosphate rock to approximately one-third to one-sixth of that required for the setting of a mixture obtained by the simultaneous mixing of all of the same reactants, which comprises, completely reacting a portion of a fine calcium containing material, reactive with concentrated phosphoric acid to form mono-calcium phosphate and which has a particle size such that at least substantially all of this portion will pass through a 200 mesh screen, and the concentrated phosphoric acid, containing at least 65% by weight of $H_3PO_4$, the amount of the fine calcium containing material being not more than that required to react with 20% of the $H_3PO_4$ in the concentrated phosphoric acid; and immediately mixing the fine phosphate rock with the mixture resulting from the complete reaction of the portion of the fine calcium containing material and the concentrated phosphoric acid, the amount of the fine phosphate rock being substantially that required to react with the free phosphoric acid in the mixture to form monocalcium phosphate.

4. Process for reducing the time of setting of a reaction mixture of concentrated phosphoric acid and fine limestone to approximately one-third to one-sixth of that required for the setting of a mixture obtained by the simultaneous mixing of all of the same reactants, which comprises, completely reacting a portion of a fine calcium containing material, reactive with concentrated phosphoric acid to form mono-calcium phosphate and which has a particle size such that at least substantially all of this portion will pass through a 200 mesh screen, and the concentrated phosphoric acid, containing at least 65% by weight of $H_3PO_4$, the amount of the fine calcium containing material being not more than that required to react with 20% of the $H_3PO_4$ in the concentrated phosphoric acid; and immediately mixing the fine limestone with the mixture resulting from the complete reaction of the portion of the fine calcium containing material and the concentrated phosphoric acid, the amount of the fine limestone being substantially that required to react with the free phosphoric acid in the mixture to form monocalcium phosphate.

5. Process for reducing the time of setting of a reaction mixture of concentrated phosphoric acid and a fine calcium containing material, reactive with concentrated phosphoric acid to form mono-calcium phosphate to approximately one-third to one-sixth of that required for the setting of a mixture obtained by the simultaneous mixing of all of the same reactants, which comprises, completely reacting a portion of the fine calcium containing material, which has a particle size such that at least substantially all of this portion will pass through a 200 mesh screen, and the concentrated phosphoric acid, containing at least 65% by weight of $H_3PO_4$, the amount of fine calcium containing material being not more than that required to react with 20% of the $H_3PO_4$ in the concentrated phosphoric acid; and immediately mixing the remainder of the fine calcium containing material with the mixture resulting from the complete reaction of the calcium containing material and the concentrated phosphoric acid, the amount of the fine calcium containing material being substantially that required to react with the free phosphoric acid in the mixture to form monocalcium phosphate.

6. Process for reducing the time of setting of a reaction mixture of concentrated phosphoric acid and two fine calcium containing materials, reactive with concentrated phosphoric acid to form mono-calcium phosphate to approximately one-third to one-sixth of that required for the setting of a mixture obtained by the simultaneous mixing of all of the same reactants, which comprises, completely reacting a portion of one of the fine calcium containing materials and which has a particle size such that at least substantially all of this portion will pass through a 200 mesh screen and the concentrated phosphoric acid, containing at least 65% by weight of $H_3PO_4$, the amount of the fine calcium containing material being not more than that required to react with 20% of the $H_3PO_4$ in the concentrated phosphoric acid; and immediately mixing the other calcium containing material with a mixture resulting from the complete reaction of the calcium containing material and the concentrated phosphoric acid, the amount of the other calcium containing material being substantially that required to react with the free phosphoric acid in the mixture to form monocalcium phosphate.

7. Process for reducing the time of setting of a reaction mixture of concentrated phosphoric acid and a fine calcium containing material, reactive with concentrated phosphoric acid to form monocalcium phosphate to approximately one-third to one-sixth of that required for the setting of a mixture obtained by the simultaneous mixing of all of the same reactants, which comprises, making a calcium phosphate solution in the concentrated phosphoric acid, containing at least 65% by weight of $H_3PO_4$, without combining more than 20% of the phosphoric acid in so doing; and immediately mixing the calcium containing material with the solution of calcium phosphate in the concentrated phosphoric acid, the amount of the calcium containing material being substantially that required to react with the free phosphoric acid in the mixture to form monocalcium phosphate.

ROGER H. NEWTON.